W. S. THOMSON.
WHIFFLETREE CLEVIS HOOK.
APPLICATION FILED FEB. 23, 1909.
938,524.
Patented Nov. 2, 1909.
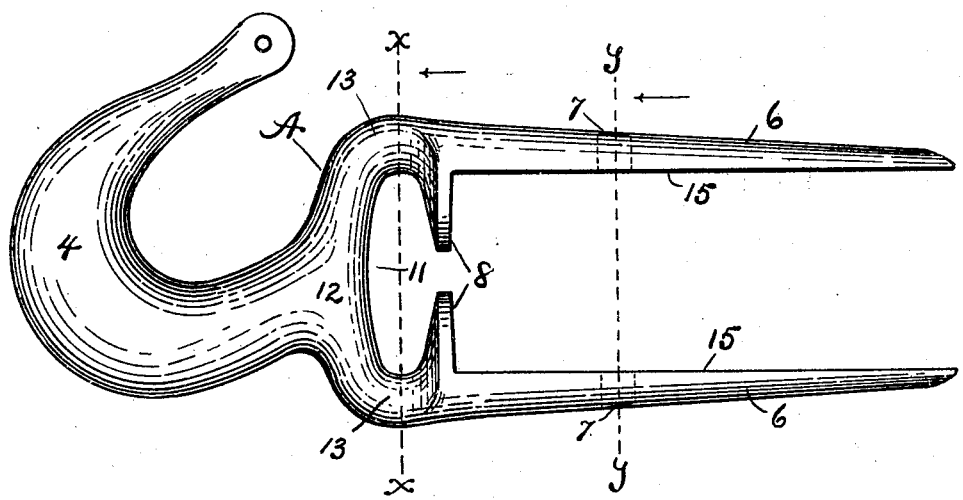
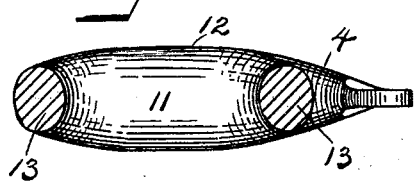
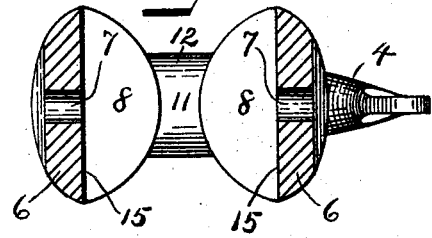
Witnesses.
S. H. Clarke
N. L. Lockwood.
Inventor.
William S. Thomson.
By Louis M. Schmidt.
Atty.

UNITED STATES PATENT OFFICE.

WILLIAM S. THOMSON, OF PLANTSVILLE, CONNECTICUT, ASSIGNOR TO H. D. SMITH AND COMPANY, OF PLANTSVILLE, CONNECTICUT, A CORPORATION.

WHIFFLETREE CLEVIS-HOOK.

938,524.

Specification of Letters Patent.

Patented Nov. 2, 1909.

Application filed February 23, 1909. Serial No. 479,593.

*To all whom it may concern:*

Be it known that I, WILLIAM S. THOMSON, a citizen of the United States, residing at Plantsville, in the county of Hartford and State of Connecticut, have invented certain new and useful Improvements in Whiffletree Clevis-Hooks, of which the following is a specification.

My invention relates to improvements in clevis hooks and the objects of my improvements are simplicity and economy in construction and convenience and efficiency in use.

In the accompanying drawing: Figure 1 is a side elevation of my clevis hook. Fig. 2 is a sectional view of the same on the line *x x* of Fig. 1. Fig. 3 is a sectional view of the same on the line *y y* of Fig. 1.

A, is a complete clevis hook of which 4 is the hook proper, at one end of the complete article, having at the other end a fork to receive the wood work of the whiffletree or other part of the wagon to which the hook may be applied, said fork having two similar plates 6, respectively top and bottom, each having the inner faces 15 substantially plane and parallel, the said plates being provided with holes 7 for fastening rivets, screws or bolts, and having at the ends adjacent the hook similar inwardly projecting stop flanges 8, the stop faces of the said flanges being at approximately right angles to the inner faces 15 of the top and bottom plates 6, the said stop flange approaching one another but separated at the tips by a space. As described the inner faces of the said top and bottom plates 6 and the adjacent faces of the said stop flanges 8 form three sides of a rectangle having the end wall interrupted at its center by the said space between the confronting ends of the said stop flanges.

The top and bottom plates 6 are connected by a U shaped connecting loop 11, on the apex 12 of which loop is the said hook 4. Between the ends and the apex 12 of the connecting loop 11 there is a point 13 of reduced thickness and relatively flexible as compared with the other parts of the said loop 11, so that the connecting loop 11 when properly heated if necessary is adapted to yield to pressure applied to the top and bottom plates 6 for the purpose of bringing said plates 6 closer together or to pressure applied to the inner faces 15 of said top and bottom plates 6 for the purpose of spreading the same farther apart. The article is preferably made in one piece by drop forging.

By the construction described a lot of hooks A of a given set of dimensions may be individually readily compressed or expanded to compensate for variations of size in the work with which they are to be used and this may readily be done by an ordinary blacksmith, and without any buckling or deforming effect or any change in the general outward appearance of the same.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim as my invention:—

1. A clevis hook, comprising a hook, two substantially parallel fork branches having plates adapted to receive the part of the wagon on which the hook is to be mounted, and an open connecting loop intermediate the said hook and the said plates.

2. In a clevis hook having a hook and two plates provided with stop flanges, a compressible connecting loop intermediate the said hook and the said plates.

3. An adjustable clevis hook, comprising a hook, confronting plates having stop flanges, and a connecting loop intermediate the said hook and said plates having a point of reduced dimensions between the said hook and the said plates.

4. A clevis hook, having a hook at one end mounted on the apex of a connecting loop, the arms of said connecting loop of relatively reduced dimensions, the ends of said loop supporting outwardly projecting substantially parallel plates, the said plates provided at the points of attachment with the said connecting loop with inwardly projecting stop flanges, said stop flanges being located opposite one another and separated at their confronting ends by an appreciable space.

5. A whiffletree-clevis hook comprising a pair of substantially parallel securing plates disconnected from each other at one end, a hook in front of the opposite ends of the said plates, and a bendable connecting loop between the shank of the said hook and the adjacent front ends of the said plates, the said loop being short in the longitudinal direction of the said plates and longer in the transverse direction thereto, whereby the hook is close to the said front ends and the distance between the said plates may be varied by bending the said short connecting loop.

6. A whiffletree-clevis hook comprising a pair of substantially parallel securing plates disconnected from each other at one end and having terminal confronting shoulder flanges at their extreme opposite ends, a hook in front of the said opposite ends, and a bendable connecting loop between the shank of the said hook and the junction of the said flanges with the adjacent ends of the said plates, the said loop being substantially oblong with its greatest dimensions extending transversely to the said plates and bendable at its opposite ends for varying the distance between the said parallel plates.

WILLIAM S. THOMSON.

Witnesses:
C. W. CAMP,
LOUIS H. SCHMITT.